Figure 1:
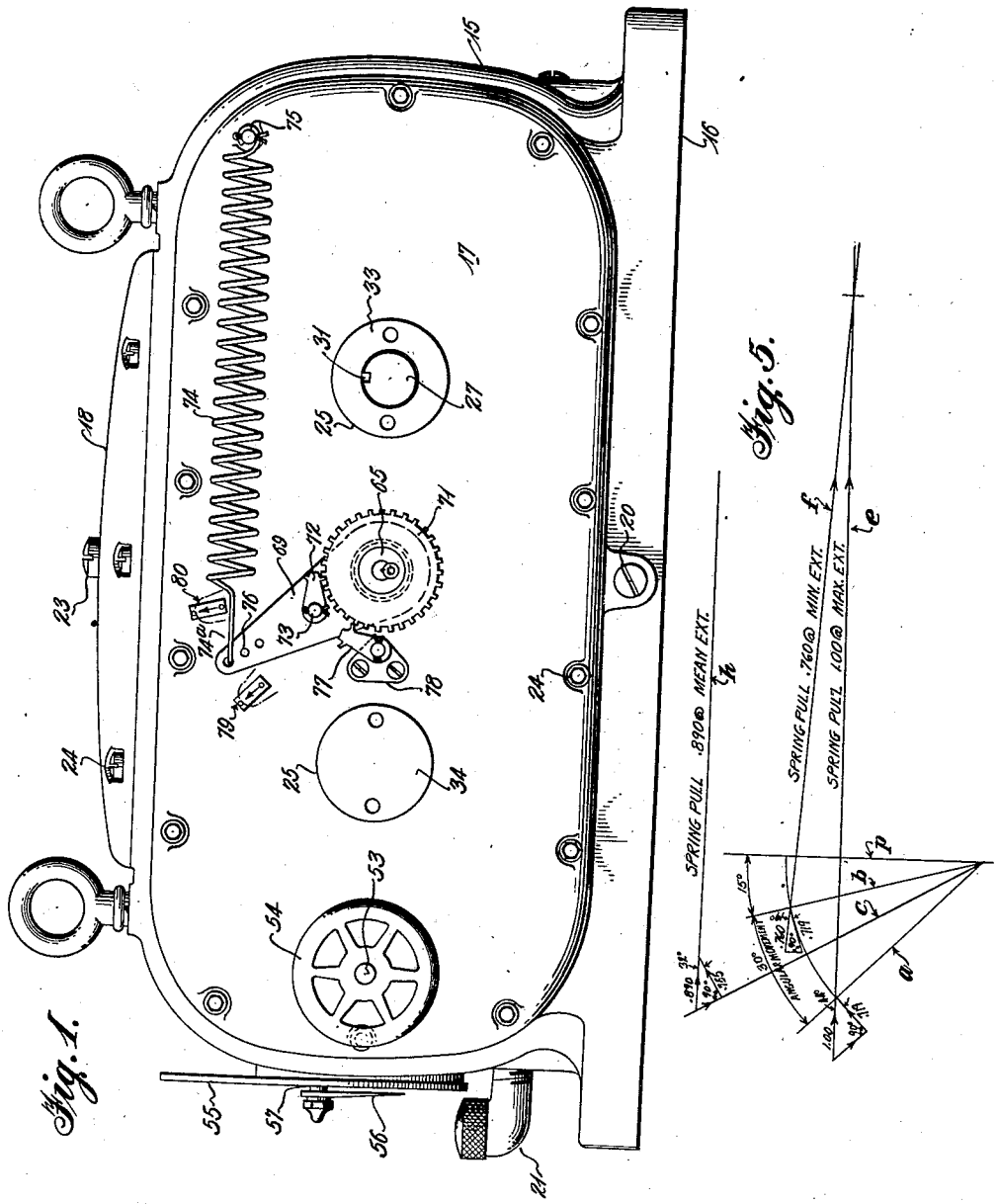

Dec. 16, 1941.    H. G. KELLER    2,266,687
AUTOMATIC CHAIN OR BELT TENSIONING MECHANISM
Filed March 29, 1940    7 Sheets-Sheet 1

Inventor
Henry G. Keller
By L. Donald Myers
Attorney

Dec. 16, 1941.   H. G. KELLER   2,266,687
AUTOMATIC CHAIN OR BELT TENSIONING MECHANISM
Filed March 29, 1940   7 Sheets-Sheet 3

Inventor
Henry G. Keller
By L. Donald Myers
Attorney

Dec. 16, 1941.  H. G. KELLER  2,266,687
AUTOMATIC CHAIN OR BELT TENSIONING MECHANISM
Filed March 29, 1940  7 Sheets-Sheet 4
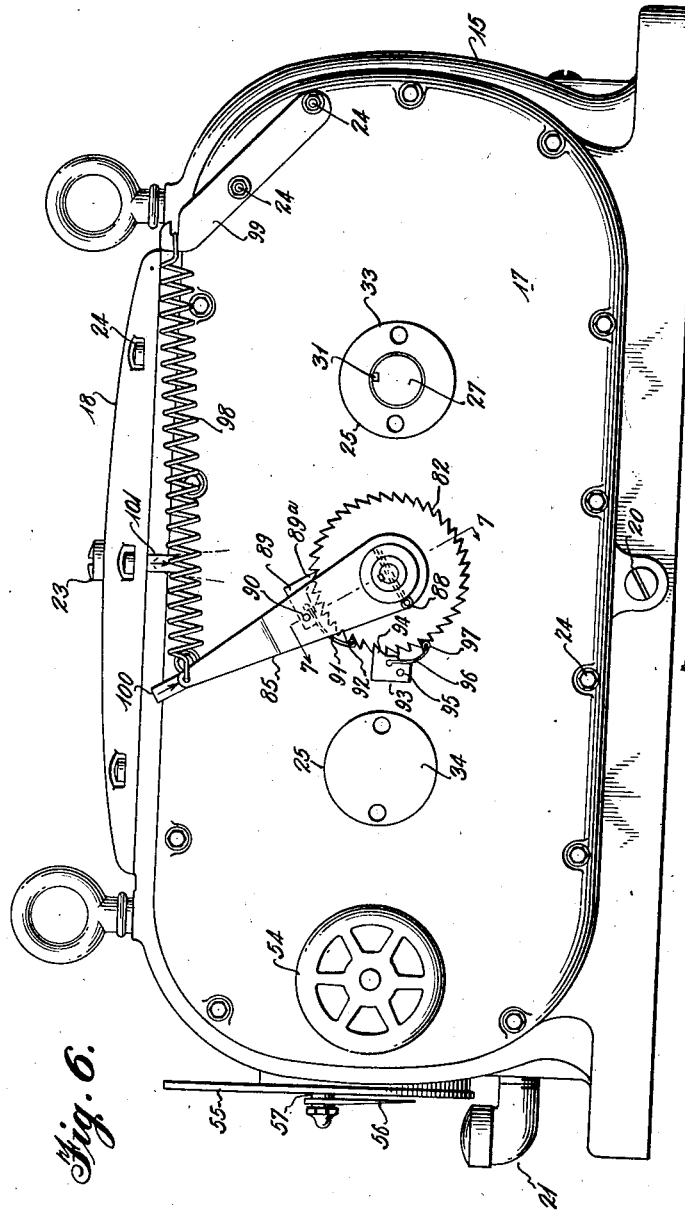
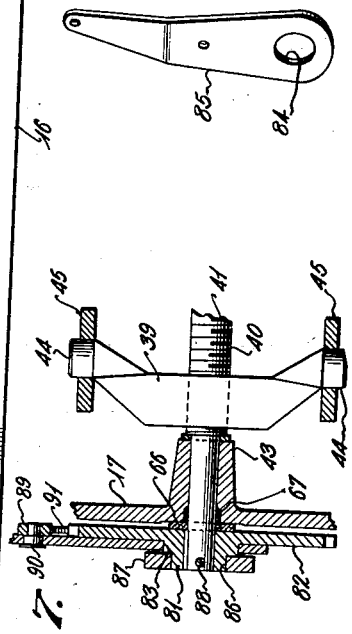
Inventor
Henry G. Keller
By L. Donald Myers
Attorney

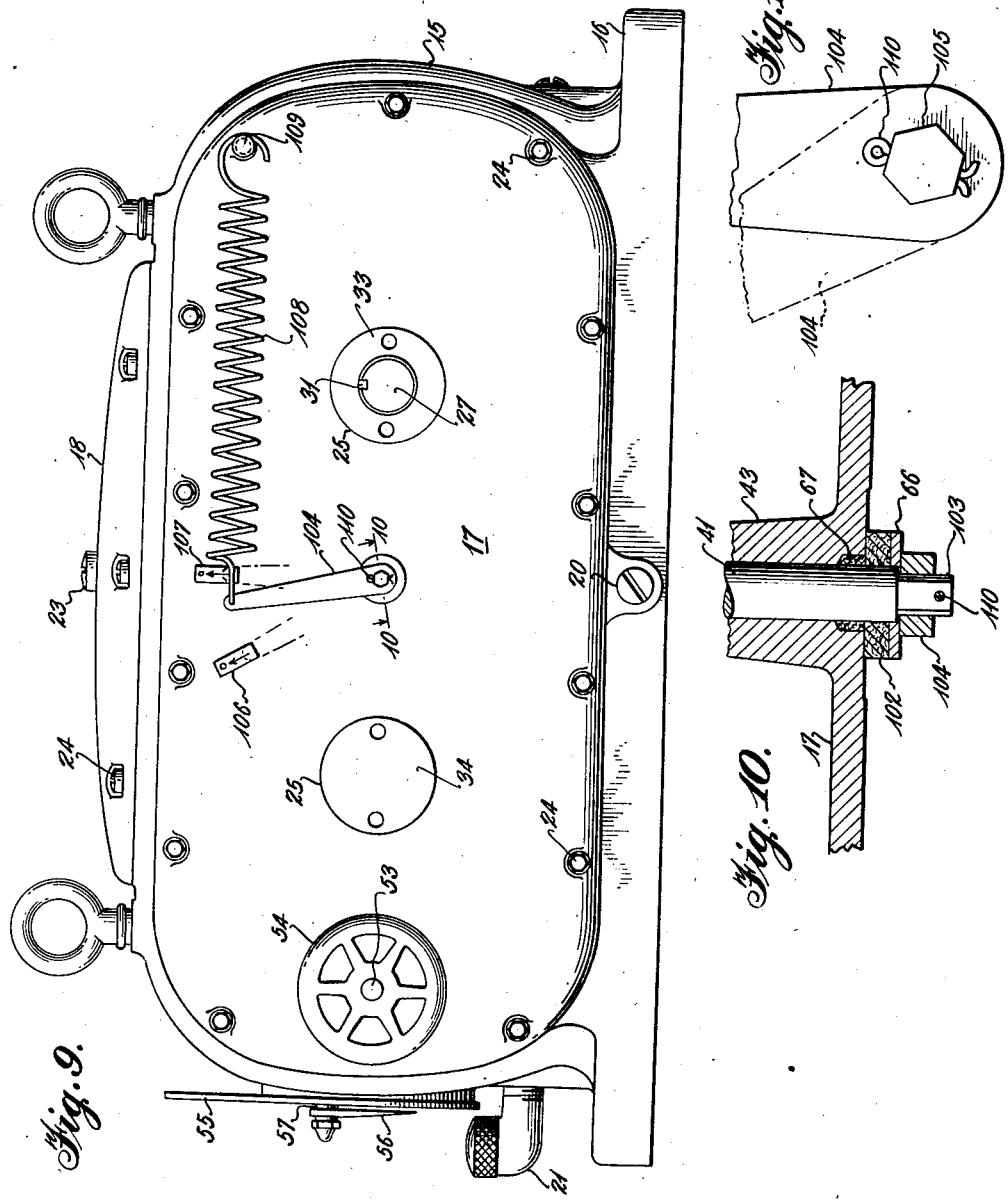

Dec. 16, 1941.                H. G. KELLER                2,266,687
              AUTOMATIC CHAIN OR BELT TENSIONING MECHANISM
                     Filed March 29, 1940        7 Sheets-Sheet 6
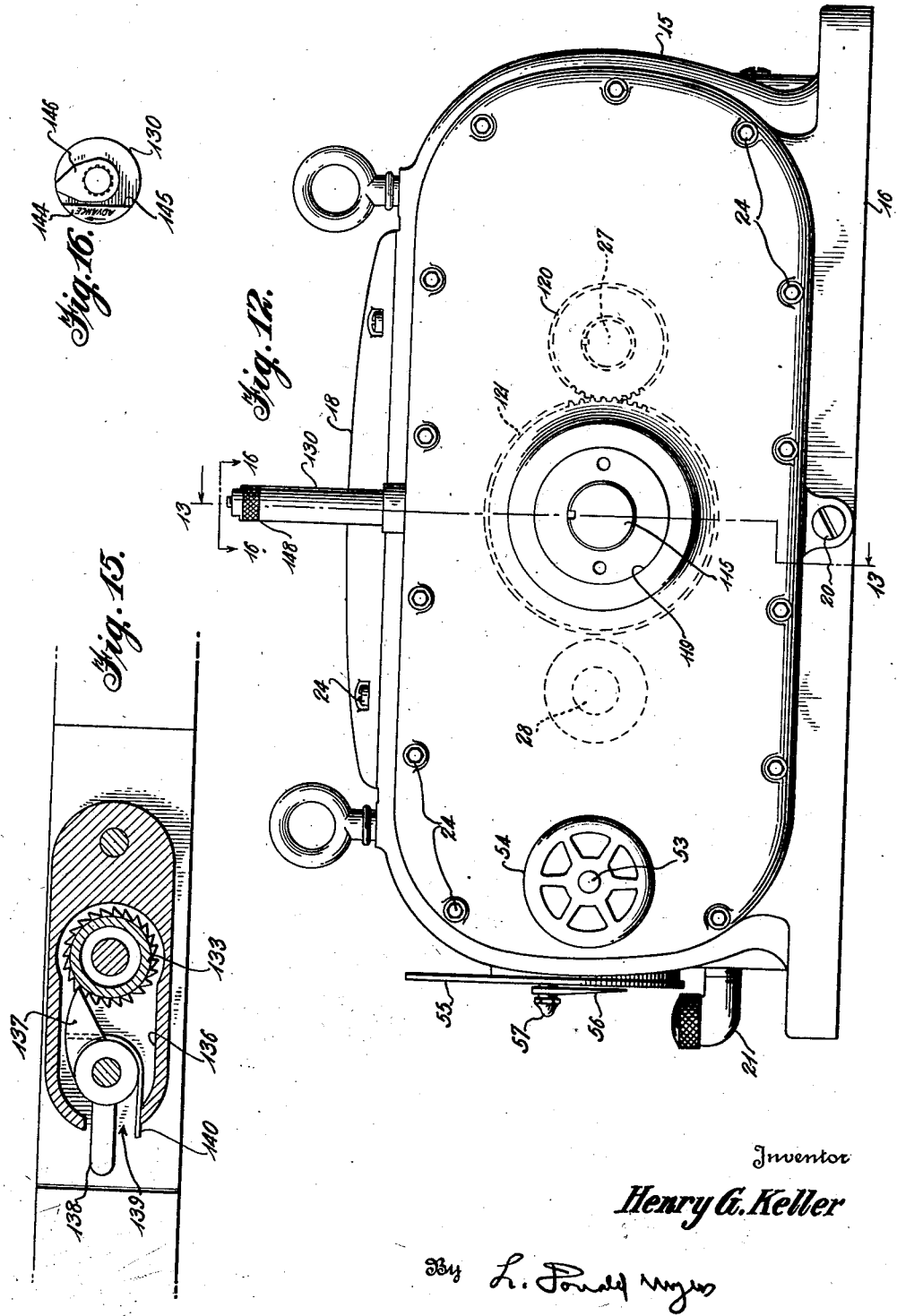
Inventor
*Henry G. Keller*
By *L. Ronald Myers*
Attorney

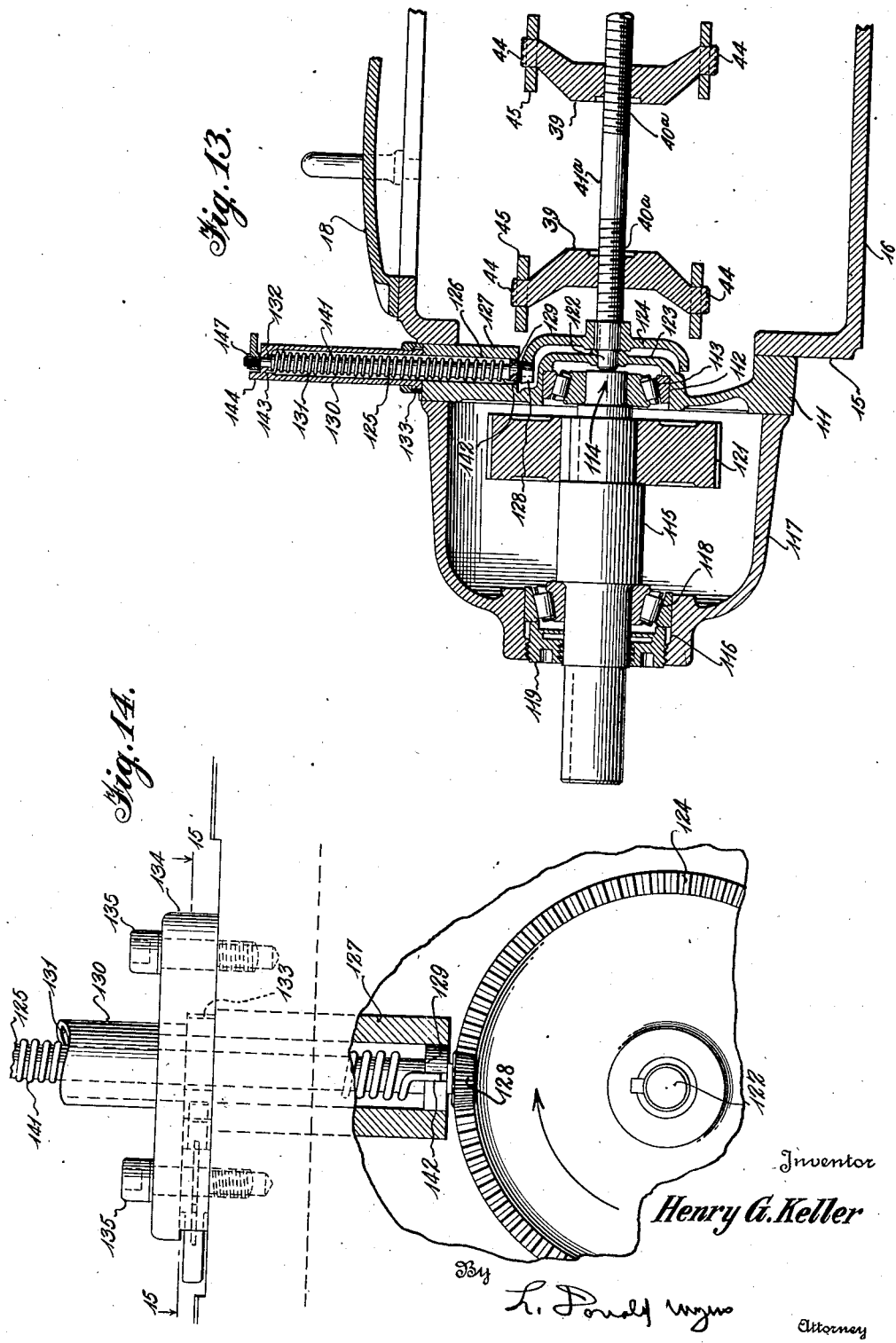

Patented Dec. 16, 1941

2,266,687

UNITED STATES PATENT OFFICE 2,266,687

AUTOMATIC CHAIN OR BELT TENSIONING MECHANISM

Henry G. Keller, Glenside, Pa., assignor to Link-Belt Company, a corporation of Illinois Application March 29, 1940, Serial No. 326,782

19 Claims. (Cl. 74—230.17)

This invention relates to new and useful improvements in mechanism for automatically maintaining at all times the desired maximum tension on the driving chains or belts of variable speed transmission gearing.

The use of infinitely variable speed gearing, of the type which includes a V-belt or chain trained about expansible and contractible V-pulleys or pairs of opposed conical wheels mounted on parallel driver and driven shafts, for driving all types of machines in every industry, is rapidly increasing because of recognition of the ability of this type of gearing to meet the industries' needs for accurate, dependable, positive, variable speed control.

However, maximum accuracy and dependability can be obtained with this type of gearing only when the chain or belt has proper intimate contact with the pulleys or wheels for all permissible speed variations. If the chain or belt is allowed to slip relative to its pulleys or wheels, due to improper meshing or seating, accurate speed control cannot be obtained or maintained, and the dependability of the unit will be greatly impaired as a result of excessive wear. Meshing or seating of the chain or belt on the effective diameters of the pairs of opposed conical wheels or cones with the proper intimate contact required to provide maximum accuracy, dependability, and positiveness of speed control can only be obtained for any given type of chain or belt and pulley or wheel construction when the chain or belt is constantly provided with the desired maximum tension at all times.

Prior attempts to obtain the desired maximum tension on chains or belts of infinitely variable speed gearing can be divided into three general types:

(1) Entirely manually adjustable belt or chain tightening mechanism.

(2) Automatically adjustable mechanism which tensions the belt or chain by applying, usually against its return or non-driving run, a pressure which will take up the stretch or wear by producing a sag in the chain or belt.

(3) Automatically adjustable mechanism which tensions the chain or belt by changing the effective diameters of either one or both pairs of opposed cones or conical wheels to take up the stretch or wear and without allowing any sag to appear therein.

The manually adjustable tensioning mechanism of the first type, of course, is entirely inadequate for it is dependent in the first instance on the judgment of the attendant, and it is necessary to make an adjustment after each increment of wear occurs, or the tension will vary.

The automatic tensioning mechanism of the second type usually consists of a spring or weight loaded lever which has a sliding or rolling contact with the outer side of the chain or belt. The load on the lever is intended to maintain at all times a sufficient amount of pressure against the chain or belt to take up all of its slack by forming a sag in the said non-driving run of the same and to apply a constant maximum tension of a desired value to the chain or belt. A well-known principle of physics, however, makes it impossible for this type of mechanism to accomplish the desired result. This principle is that the tension produced in a wire, or the like, stretched between supports, by a weight suspended on the wire, intermediate its supports, varies with changes in the angle formed by the portions of the wire located on opposite sides of the weight. The tension decreases as the angle decreases, and vice versa. Therefore, as the belt or chain, being automatically tensioned by this type of mechanism, wears and stretches, the amount of slack increases, and the angle formed by the sides of the sag decreases. Because of this decrease in angle, the tension applied to the chain or belt by this type of automatic tensioning mechanism, which takes the place of the weight in the aforesaid principle, becomes less. As the object of employing an automatic tensioning mechanism is to maintain a constant desired maximum tension on a chain or belt while it stretches and wears, and as this type of mechanism becomes less effective after each increment of wear occurs, maximum accuracy and dependability cannot be obtained therewith.

The automatic tensioning mechanism of the third type usually employs spring means for applying the force which controls the relative positions and thereby the effective diameters of the opposed cones or conical wheels positioned on either one or both shafts. The most satisfactory form this third type of automatic tensioning mechanism may take consists of spring means for supplying the force used to bodily shift the fulcrums for the control members or levers which are employed to change the ratio of the gearing by varying the effective diameters of the two pairs of cones or conical wheels. By changing the positions of the fulcrums for these control members, both pairs of cones or wheels necessarily have their effective diameters uniformly varied. One such mechanism provides the additional feature of preventing retrograde movement of the fulcrums for the control members or levers after each adjustment to take up stretch or wear in the chain or belt.

This third type of automatic tensioning mechanism probably offers the greatest possibilities of all of the prior tensioning devices and, of this type, the form which prevents retrograde movement of the fulcrums of the ratio controlling members or levers embodies the best basic operating principles. This form of mechanism, theoretically, is capable of maintaining a uniform tension on the belt or chain as it wears and stretches, but the difficulty is that the tension which is uniformly maintained usually is of such an order as to provide an excessively tight chain or belt. The reason for this difficulty can best be explained by pointing out that the mechanism operates to eliminate all sag in the chain or belt and attempts to apply just the desired maximum tension by responding to variations in the length of the sagless chain or belt. As these variations in length occur in very small increments and are not easily determined or measured, it requires a very sensitive or refined device to accurately respond to the same. It is not possible to consistently adjust the action of this type of automatic tensioning mechanism so that it will accurately measure or determine these slight variations in length and properly respond thereto.

My invention may be broadly described as embodying an entirely new principle or mode of operation which is obtained by combining certain forms and features of the two prior types of automatic tensioning mechanisms into one composite mechanism in such a way as to cause the undesirable action of one type of mechanism to overcome or correct the undesirable action of the other type. That is, I reduce the degree of sensitivity required in the action of the third type of mechanism by superimposing thereon the sag producing action of the second type of mechanism and take advantage of the action which prevents the second type of mechanism from operating satisfactorily to obtain an extremely effective and neatly balanced tension producing action between the two mechanisms. To be more specific, this new composite automatic tensioning mechanism includes one automatically operating instrumentality which will produce a sag in the non-driving run of the chain or belt by applying pressure to said run. The amount or depth of sag thus produced will, of course, increase as the chain or belt wears and stretches and the angle formed by the sides of the sag will decrease as the amount or depth of the sag increases. Therefore, starting from a point where the desired maximum tension is applied to the chain or belt, this sag producing mechanism will apply less tension as the angle formed by the sides of the sag decreases. The composite mechanism also includes another automatically operating instrumentality which will be constantly endeavoring to eliminate the sag from the chain or belt by exerting pressure tending to increase the effective diameters of the pulleys. Again starting from a point where the desired maximum tension is applied to the chain or belt, but in this instance by the combined action of both of the instrumentalities, the forces exerted by the two instrumentalities, after taking into account certain other factors, such as friction, etc., will be neatly balanced, or in equilibrium. Now, as the chain or belt wears and stretches, the amount or depth of the sag will increase and the angle formed by the sides of the sag will decrease with the result that the sag producing instrumentality will exert less tension producing force and will no longer balance the tension producing force of the other instrumentality. This other instrumentality will then overpower the sag producing instrumentality and will reduce the amount or depth of the sag by increasing the effective diameters of the pulleys. The amount or depth of the sag will be reduced until the two instrumentalities are again balanced, or in equilibrum. With the above explanation, it will be obvious that the degree of sensitivity required in the action of the instrumentality which applies tension by increasing the effective diameters of the pulleys; i. e., the third type of mechanism, will be reduced because it will not be required to respond to slight variations in length of a sagless chain or belt. Instead, it will be required to respond to variations in the much more positive force of the sag producing mechanism.

It is the primary object of this invention to provide automatic tensioning mechanism for the chains or belts of variable speed gearing which will operate to apply a uniform desired maximum tension at all times.

Another important object of the invention is to provide means for periodically effecting adjustment of the automatic tensioning mechanism which does not depend in any way on the judgment of the attendant of the unit.

Other objects and advantages of the invention will be apparent during the course of the following description.

Figure 2:
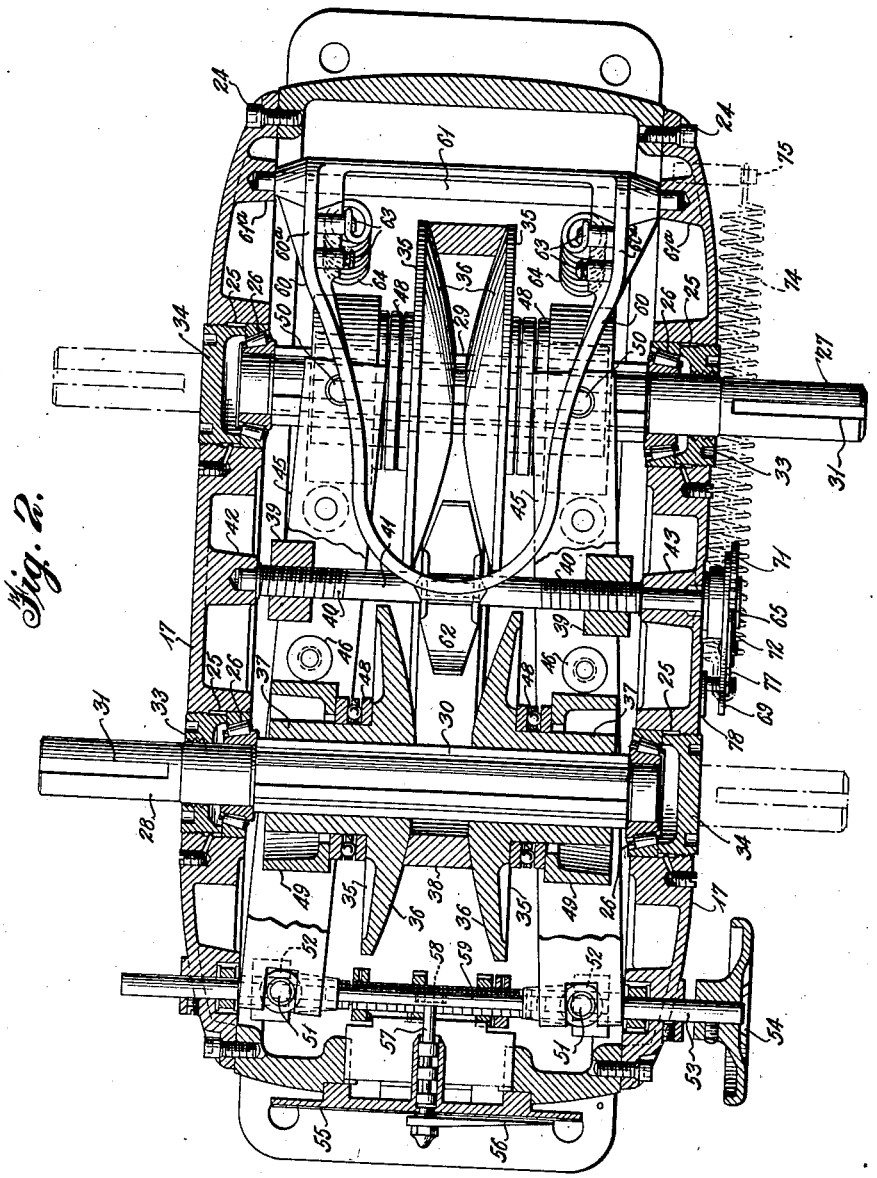
Figures 3, 4:
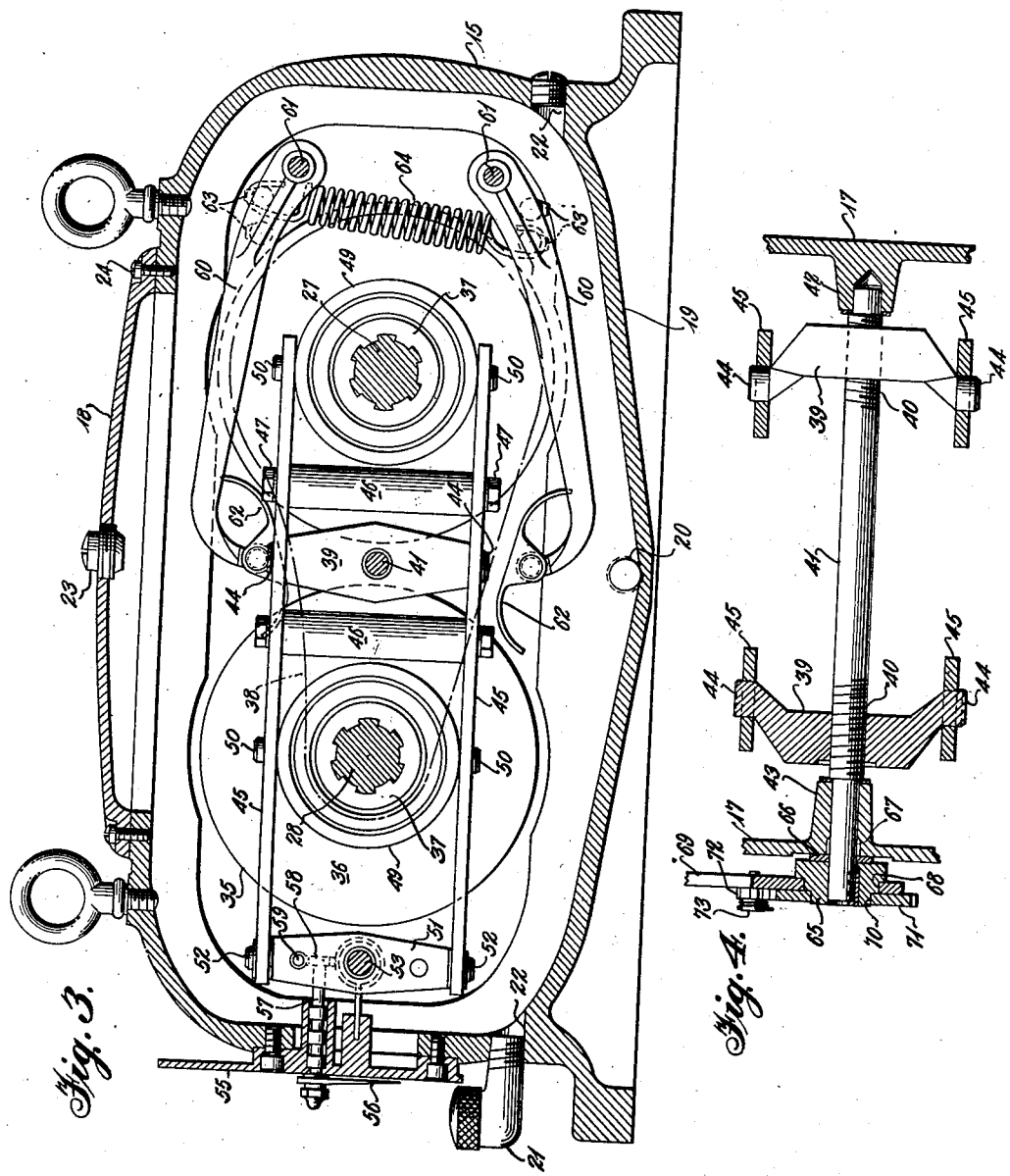

In the accompanying drawings froming a part of this specification, and in which like numerals are employed to designate like parts throughout the same:

Figure 1 is a side elevational view of a variable speed transmission unit having one embodiment of the invention applied thereto, Figure 2 is a horizontal sectional view of the transmission unit disclosed in Fig. 1, Figure 3 is a vertical sectional view taken through the unit disclosed in Figs. 1 and 2, Figure 4 is a detail, vertical sectional view of a part of the tensioning mechanism embodying this invention, Figure 5 is a diagram which illustrates the pull or force producing action of certain spring means included as a part of automatic tensioning mechanism embodying this invention, Figure 6 is a view similar to Fig. 1 but illustrates a slightly modified form of adjusting means for the tensioning mechanism, Figure 7 is a detail, sectional view taken on line 7—7 of Fig. 6, Figure 8 is a detail, perspective view illustrating an adjusting lever incorporated in the mechanism of Figs. 6 and 7, Figure 9 is a view similar to Figs. 1 and 6 but illustrates a still further modified form of adjusting means for the tensioning mechanism, Figure 10 is a detail, transverse sectional view taken on line 10—10 of Fig. 9, Figure 11 is a detail, elevational view illustrating the mounting of the lever disclosed in Figs. 9 and 10, Figure 12 is a view similar to Fig. 1 and illustrates still another modified form of tensioning mechanism, Figure 13 is a fragmentary vertical sectional view taken on line 13—13 of Fig. 12, Figure 14 is a detail, enlarged view, partly in vertical section and partly in elevation, of the tensioning mechanism better illustrated in Fig. 13.

Figure 15 is a detail, horizontal sectional view taken on line 15—15 of Fig. 14, and, Figure 16 is a detail plan view taken on line 16—16 of Fig. 12 and illustrates the upper or top end of control mechanism.

In the drawings, wherein for the purpose of illustration are shown the preferred embodiments of this invention, and particularly referring to Figs. 1, 2, and 3, there is disclosed an infinitely variable speed transmission unit which includes the housing 15 having a suitable base 16 and being open at its opposite sides and top. The sides are disclosed in Figs. 1 and 2 as being closed by side plates 17. Figs. 1 and 3 disclose the opening in the top of the housing as being closed by the removable inspection cover plate 18. Fig. 3 discloses the bottom wall 19 of the housing 15 as being suitably depressed or shaped to provide an oil retaining well which may be drained through the opening 20. An oil gauge 21 may be attached to either end of the housing 15 by means of the threaded apertures 22. An oil filler and breather plug 23 is threadedly mounted in the inspection cover plate 18. Suitable screws, or the like, 24 are employed for attaching the side and cover plates 17 and 18 to the housing 15.

Figs. 1 and 2 disclose each side plate 17 as having formed therein two bearing openings 25. Suitable bearings 26 are mounted in the four bearing openings 25. These bearings are adapted to support the constant speed driver shaft 27 and the variable speed driven shaft 28. These shafts are splined at 29 and 30, respectively, or throughout their intermediate portions which extend between the bearings 26. Each of these two shafts has one end projecting outwardly of the housing, through its bearing opening 25, and is formed with a keyway 31 which enables any suitable power transmitting devices to be properly secured thereto. Fig. 2 discloses each one of the shafts 27 and 28 as having an end projecting from the housing and illustrated in full lines. By dot and dash line disclosures, it is shown that the said shafts may be constructed and arranged so that they may project from either or both sides of the housing. Annular bearing caps 33 are positioned in the bearing openings 25 through which the ends of the shafts 27 and 28 project. Solid bearing caps or bearing opening closure caps 34 may be positioned in the bearing openings 25 where the shafts do not project from the housing.

The splined portions 29 and 30 of the two shafts have mounted thereon a pair of wheels, or the like, 35 which are formed with opposed, conical contact surfaces or faces 36. Fig. 2 clearly discloses these wheels 35 as being arranged in pairs on the two shafts 27 and 28. By means of their relatively long hubs 37, these wheels are slidably mounted on the said shafts. A flexible transmission member 38 is illustrated as being trained over the expansible and contractible pulleys which are formed by the pairs of wheels 35. Due to the relative spacing between the wheels 35 of the respective pulleys, these pulleys are illustrated in Fig. 2 as having different effective diameters. For example, the constant speed driver shaft 27 has its pulley wheels 35 arranged so that they have a larger effective diameter than the pulley wheels 35 carried by the variable speed driven shaft 28. With this arrangement, of course, the driven shaft 28 will rotate at a higher rate of speed than the driver shaft 27. It will be understood, however, that the effective diameters of the two pulleys may be changed either to vary the ratio between the driver and driven shafts with the driver shaft still rotating at a slower speed than the driven shaft, or the pulley wheels 35 on the two shafts may be arranged so that the driver shaft will rotate at a higher rate of speed than the driven shaft. The mechanism for accomplishing such changes in effective diameters of the two pulleys will be referred to at a later point.

Fig. 2 illustrates the contact or working faces 36 of the wheels 35 as being smooth and the flexible transmission member 38 is illustrated as taking the form of a V-belt which frictionally engages the surfaces or faces 36. It is to be understood, however, that the contact or working faces 36 of the wheels may, if desired, be formed as disclosed in the G. J. Abbott Patent 1,637,402, issued August 2, 1927, and the flexible transmission member 38 may take the form shown in the G. J. Abbott Patent 1,814,883, issued July 13, 1931. As smooth face and toothed face pulley wheels with appropriately constructed flexible transmission members are well known in the art, it is unnecessary to disclose in detail both of these types of gearing. Therefore, the expression "a contractible and expansible V-pulley" employed in the specification and claims is intended to refer to and include wheels having either smooth or toothed contact surfaces or faces, and the expression "a flexible transmission member" is intended to refer to and include either belts or chains of appropriate construction for use on these two different types of pulley wheel contact surfaces.

The pairs of wheels 35, slidably splined on the shafts 27 and 28 are expanded and contracted to vary the effective diameters of the pulleys formed by the same. As one pulley is expanded, the other pulley is correspondingly contracted. When the effective diameter of a pulley is to be increased, its wheels 35 are forced toward each other. The mechanism employed for forcing these wheels toward each other simultaneously functions to allow the wheels of the remaining pulley to move away from each other. The effective diameter of the second pulley, therefore, is reduced in approximate proportion with the increase in effective diameter of the first mentioned pulley.

Figs. 2 and 3 disclose fulcrum blocks 39 adjustably mounted on the oppositely threaded sections or portions 40 of an adjusting screw 41 which is journaled in bearing enlargements 42 and 43 carried by the opposite side plates 17. This adjusting screw is located between the driver and driven shafts 27 and 28 and is arranged in parallelism with the same. The pivot blocks 39 are clearly illustrated in Fig. 2 as being located on opposite sides of the two pulleys. Each pivot block 39 is provided with a pivot stud 44 at both of its ends, see Figs. 3 and 4. An operating lever 45 is pivotally mounted on each one of these studs 44. Therefore, each fulcrum block 39 has pivotally mounted thereon two operating or controlling levers 45. A pair of spacing and bracing members 46 is provided for each pair of controlling or operating levers 45. Figs. 2 and 3 clearly disclose these spacing and bracing members 46 as being arranged on opposite sides of their fulcrum blocks 39 and as being secured to their respective controlling or operating levers 45 by means of the screws 47.

The hub 37 of each pulley wheel 35 is clearly illustrated in Fig. 2 as having mounted thereon a ball thrust bearing 48. One race of each of these bearings engages the back of its respective wheel 35. Bearing against the remaining race is a thrust bearing yoke 49. These yokes are provided with diametrically arranged studs 50 which are received in suitable openings formed in the operating or controlling levers 45. With this arrangement, each one of the pulley wheels 35 is backed up by a ball thrust bearing 48 and a thrust bearing yoke 49, and each thrust bearing yoke is connected to both of the operating or controlling levers 45 arranged on its side of the V-pulley.

To effect the desired pivotal movements of the two pairs of operating or controlling levers 45 about their pivot studs 44 of the fulcrum blocks 39, the control or operating levers 45 project to one side of one of the V-pulleys for engagement with the studded ends 51 carried by the two control brackets 52 which are threadedly mounted on the speed control screw 53. This screw is suitably journaled in bearings carried by the opposite side plates 17. One projecting end of this screw has mounted thereon a speed control hand wheel 54.

A speed control gauge plate 55 is attached to the adjacent end of the housing 15. This plate 55 has indicated thereon suitable scale or graduation lines, not shown, which cooperate with the speed setting indicator pointer 56 for denoting the speed setting ratio of the two contractible and expandable V-pulleys. The indicator-pointer 56 is carried by a shaft 57 having a suitable rack gearing connection 58 with the rod 59 which is attached to and moved with one of the control brackets 52. Therefore, as this control bracket moves laterally in opposite directions, the rod 59 will partake of the same movement and the rack teeth formed thereon will effect rotation of the indicator shaft 57 in opposite directions, depending upon the direction of movement of the rod 59.

It was pointed out in the introductory portion of the specification that the desired maximum tension is applied to the flexible transmission member 38 by means of the combined action of sag producing and sag eliminating instrumentalities.

The sag producing instrumentality takes the form of a pair of lever members 60 which are pivotally mounted on the transversely extending shafts 61 carried by suitable bearings 62 formed in the side plates 17. The outer end of each one of these lever members 60 has pivotally mounted thereon a shoe 62. These shoes are adapted to bear against the outer faces or surfaces of the flexible transmission member 38 between the two expansible and contractible V-pulleys. In other words, one of these shoes 62 will bear against the driving run or reach of the flexible transmission member and the other shoe will bear against the non-driving run or reach of the said member. Although these levers 60 are illustrated in Figs. 2 and 3 as carrying shoes which will have sliding contact or engagement with the flexible transmission member, it is to be understood that rollers, or the like, may be substituted for the shoes and have rolling contact with the flexible transmission member.

For the purpose of applying the desired amount of load or force to the lever 60, each side arm portion 60a has projecting laterally inwardly thereof a pair of buttons or studs 63, to appropriate ones of which the tension springs 64 are attached. Figs. 2 and 3 illustrate these springs 64 as being connected to the inner buttons or studs 63 of the upper lever 60 and to the outer buttons or studs 63 of the lower lever 60. Fig. 3 very clearly illustrates the flexible transmission member 38 as having a sag formed in the upper or non-driving run of the same. This sag, of course, is produced as a result of the application of force or pressure to the flexible transmission member by means of the springs 64 and the coaction of the two levers 60, one of which bears against the driving run and the other of which bears against the non-driving run of the flexible transmission member. This application of pressure to the flexible transmission member naturally tensions the member. The tension applied to the flexible transmission member by the spring loaded levers 60 will vary in intensity as the angle formed by the sides of the sag in the flexible transmission member varies. The tension produced by the spring loaded levers 60 will decrease as the angle of the sides of the sag decreases or as the depth of the sag increases. This reduction in tension results not only from the contraction of the springs 64 but also as a result of the rule or law of physics referred to above in the introduction of the specification.

The instrumentality which constantly exerts a force tending to eliminate the sag from the flexible transmission member 38 accomplishes this desired result by rotating the adjusting screw 41 in the proper direction to cause the fulcrum blocks 39 to move toward each other. This movement of the fulcrum blocks toward each other causes the opposed pairs of operating or controlling levers 45 to move closer together and thereby increase the effective diameters of both of the V-pulleys. The means for bringing about this desired rotation of the adjusting screw 41 is best illustrated in Figs. 1, 2, and 4. Figs. 1 and 4 disclose a hub member 65 as being keyed to the projecting end portion of the adjusting screw 41. A suitable washer 66 and a suitable packing 67 seal between the end portion of the adjusting screw 41 and the side plate 17, as best illustrated in Fig. 4. The hub 65 is of stepped formation to provide an annular shoulder or seat 68 on which is loosely journaled or mounted a lever 69. The stepped formation of the hub 65 also provides a shoulder or seat 70 on which is mounted the ratchet wheel 71. This ratchet wheel may be secured in any desired manner to the hub 65 so that it will rotate therewith. As this hub is suitably keyed to the adjusting screw 41, the ratchet wheel 71 may be employed as a driving member for the adjusting screw.

Fig. 1 clearly discloses the lever 69 as having mounted thereon a pawl 72 which is adapted to engage the teeth of the ratchet wheel 71. This pawl is pivotally connected to the lever 69 by means of the pin 73 and its cotter. With the pawl 72 engaging a tooth of the ratch wheel 71, angular movement of the lever 69 will bring about rotary movement of the adjusting screw 41. Angular movement of the lever 69 is accomplished by means of the tension spring 74 which is connected at its inner end to a pin 75, attached to the side plate 17. The remaining or outer end of the spring 74 is adjustably connected to the lever 69 by having its end portion 74a pass through the desired one of the three apertures 76. It will be appreciated that the force applied to the lever 69 by the spring 74 may be varied by changing the point of connection of the spring with the lever.

A safety pawl 77 is pivotally attached to the side plate 17 by means of the mounting member 78. This safety pawl 77 cooperates with the teeth of the ratchet wheel 71 to prevent retrograde movement or rotation of the said ratchet wheel and the adjusting screw 41.

It is very desirable to have the spring 74 exert as nearly as possible a constant or uniform turning effort to the adjusting screw 41. A relatively uniform turning effort may be provided if the throw or movement of the lever 69 is limited to the distance set off or indicated by the arrows 79 and 80. The arrow 79 indicates the starting position for the lever 69, and the arrow 80 indicates the stopping position. When the lever 69 registers with the arrow 80, the lever should be reset or moved back to the arrow 79. This can be accomplished by disconnecting the pawl 72 from the ratchet wheel 71 and resetting the lever. The safety pawl 77 will retain the ratchet wheel, and the adjusting screw 41 against retrograde movement while the lever is being reset.

Fig. 5 is presented to illustrate the relatively uniform turning effort which will be provided over the range of movement of the lever 69 between the arrows 79 and 80. In this figure, the line $a$ represents the angle assumed by the center line of the lever 69 when this lever registers with arrow 79. The line $b$ represents the angle assumed by the center line of the lever 69 when the lever registers with the arrow 80. The line $c$ represents the angle formed by the center line of the lever 69 when this lever is located at a point halfway between the two arrows 79 and 80. The line $p$ represents the perpendicular. It will be seen that the line $b$ forms a 15° angle with the perpendicular, or the line $p$, and the line $a$ forms a 45° angle with the line $p$. The line $c$, therefore, will form a 15° angle with each one of the lines $a$ and $b$.

The lines $e$, $f$, and $h$ represent the center lines of the spring 74 when the center line of the lever 69 corresponds respectively with lines $a$, $b$, and $c$. Legends have been applied to these lines $e$, $f$, and $h$ which provide the values for the "spring pull" for the maximum extension, the minimum extension, and the mean extension, respectively, of the three positions of the spring.

Obviously, any tension spring will effect less pull in the minimum extended position than it will in the maximum extended position. By properly selecting the angles between the center line of the spring and the center line of the lever, the component force which produces the turning effort will be relatively uniform over the given range of movement. This turning effort will be equal to the spring pull times the cosine of the included angle between the center line of the spring pull and the lever tangential. Fig. 5 discloses the included angle between the center line of the spring pull and the lever tangential for each position of the lever. When the lever assumes the position represented by the line $a$, this angle is 44°. When the lever assumes the position represented by the line $b$, the angle is 19°. When the lever assumes the position represented by the line $c$, the angle is 32°. By multiplying the spring pull for each one of these lever positions by the cosine of each one of these respective angles, the turning effort may be determined. These calculations have been made and legends designating the turning efforts for each one of the three lever positions have been applied to this figure. The legends show that the turning effort for the lever position represented by line $a$ is 0.719. The same turning effort is provided when the lever assumes the position represented by line $b$. A turning effort of 0.755 is provided when the lever assumes the position reresented by line $c$. It is believed that with the aid of this diagram and the accompanying explanation, it will be appreciated that a relatively uniform turning effort will be provided at all times while the lever is moving through the indicated range.

This limiting of the range of movement of the lever 69 to that which is represented by or marked off by the arrows 79 and 80 is a very desirable feature of this tensioning mechanism. It eliminates all need or necessity for an attendant to guess or resort to his judgment in resetting the tensioning mechanism.

It will be appreciated from the above explanation that the spring 74 is constantly exerting a force or a turning effort tending to rotate the adjusting screw 41 in a proper direction to apply tension to the flexible transmission member 38 and that the tension applied by the spring 74 is such that it tends to eliminate the sag produced in the flexible transmission member by the spring loaded levers 60. These opposing forces will provide the flexible transmission member with the desired maximum tension when they are in equilibrium, or when one force balances the other. To be more exact, the force or turning effort produced by the spring 74 and its lever 69 will balance the force or pressure applied against the flexible transmission member 38 by the spring loaded levers 60, the effect of the sag in the flexible transmission member, and the friction and thrust of the screw threaded connections between the adjusting screw 41 and the fulcrum blocks 39 when the flexible transmission member has just the desired maximum tension applied thereto.

As the flexible transmission member 38 wears and stretches, a sag of greater depth will be formed in the member by the loaded levers 60. This increase in the depth of the sag will reduce the effectiveness of the levers 60, as has been explained above. As the effectiveness of the spring loaded levers 60 becomes less, the effectiveness of the spring 74 and its lever 69 becomes relatively greater and the adjusting screw 41 will be turned to restore the desired tension in the flexible transmission member 38. In this way, the two opposing forces will always maintain the flexible transmission member properly tensioned and the flexible transmission member will always have the proper intimate contact with the working faces 36 of the opposed pairs of wheels 35. As a result, excessive wear will not occur and accurate, dependable, positive variable speed control will result.

In Figs. 6 to 8, inclusive, there is disclosed a modification of the instrumentality employed for rotating the adjusting screw 41. All other parts of the variable speed transmission unit correspond with the parts disclosed and described in detail in connection with the preceding figures. Therefore, the same reference characters will be applied to such identical elements as are disclosed in the three figures now being referred to.

The adjusting screw 41 has an end portion of the same projecting outwardly of the side plate 17 in the same manner as is disclosed in Fig. 4. This projecting end of the adjusting screw has keyed thereto the hub portion 81 of a ratchet wheel 82. This hub portion is of stepped formation to provide a shoulder 83 which fits within the opening 84 of the lever 85. This lever, therefore, is rotatably journaled on this shoulder. A second shoulder 86 is formed on the ratchet wheel hub 81 and receives a stop collar 87 that is secured in place by a cotter pin 88. This cotter pin passes entirely through the collar 87, the ratchet wheel hub 81, and the extremity of the adjusting screw 41.

The pawl mechanism employed for drivingly connecting the lever 85 to the ratchet wheel 82 consists of a toothed member 89 which is pivoted to the lever by means of the pin 90. A leaf spring 91 is anchored at one end to the toothed member 89 and is shaped at its remaining end to provide a curled or substantially cylindrical portion 92. The tooth 89a of the member 89 is adapted to engage in the groove between adjacent teeth of the ratchet wheel 82. The curled end portion 92 of the spring 91 also engages in the notch or groove between another pair of teeth on the ratchet wheel 82. With these portions 89a and 92 engaging the teeth in the manner illustrated in Fig. 6, the spring 91 will be compressed. The tooth 89a and the spring end portion 92, therefore, are constantly urged toward each other by the spring and, as a result, are forced or held at all times in engagement with the periphery of the ratchet wheel.

A safety pawl 93, having a tooth 94, is pivotally mounted on the side plate 17 by means of the pin 95. A spring 96 is suitably anchored at one end to the pawl member 93 and has a curled or substantially cylindrical end portion 97 which engages the periphery of the ratchet wheel 82. This safety pawl 93 will prevent retrograde movement of the ratchet wheel 82 both while the lever 85 is being reset and in case the operating means for the lever, its pawl 89, or the like, fails and releases the force tending to turn the adjusting screw 41.

The tension spring 98 is connected at one of its ends to the outer extremity of the lever 85 and at its other end to the post 99 which is attached to the cover plate 17 by means of the fastening members 24 which secure the side cover to the housing 15.

Arrow lines 100 and 101 are provided to indicate the proper throw of the lever 85. This lever is to register with the arrow 100 when it is reset and registers with the arrow line 101 to indicate that it is time to reset the lever. The lever should not be permitted to move beyond the arrow line 101.

As this modified form of actuating mechanism for the adjusting screw 41 operates in the same manner as the mechanism more particularly illustrated in Fig. 1, it will not be necessary to repeat this description of the operation.

Figs. 9, 10, and 11 disclose a further modified form of actuating mechanism for the adjusting screw 41. As all other elements of this unit correspond with the elements disclosed in Figs. 1 to 4, inclusive, the same reference characters will be applied and no specific description will be given.

Fig. 10 discloses a felt packing washer 102 as being interposed between the metal washer 66 and the packing 67 illustrated in detail in Figs. 4 and 7. It is to be understood that the previously described mechanisms may be provided with such a felt washer if desired. The projecting end portion of the adjusting screw 41 is illustrated in Figs. 10 and 11 as having a reduced, multi-sided or faced portion 103 on which is mounted the lever 104. This lever is provided with an opening 105 which is of identical shape with the cross-sectional shape of the portion 103 of the adjusting screw. By inspecting Fig. 11, it will be seen that this multi-sided or faced opening 105 of the lever 104 is not symmetrically arranged with respect to the center line of the lever. To be more specific, the center line of the lever does not pass through two flat side faces of the opening 105 at the centers of these faces. The opening 105 is turned slightly about its axis so that the center line of the lever passes through opposed faces of the opening at points closer to one end of each of the faces. Due to this arrangement, the setting of the lever 104 with respect to the adjusting screw 41 may be changed by removing the lever from the end portion of the adjusting screw, reversing the lever face-for-face and then replacing the lever on the end of the adjusting screw. Fig. 11 discloses the lever 104 connected to the end of the adjusting screw in one of its possible positions. In dash lines the lever 104 is illustrated in its reversed position, or after the lever has been removed from the end of the adjusting screw 41 and turned about its longitudinal axis through 180°.

The reason this lever opening 105 is arranged as described is to permit the lever to be reset after it has moved from the position indicated by the arrow 106 to the position indicated by the arrow 107. The resetting of the lever 104, therefore, is accomplished by disconnecting it from the end of the adjusting screw 41 and reversing the lever face-for-face before reapplying it to the end of the adjusting screw. This reversing of the lever 104, while the adjusting screw 41 remains stationary, resets the lever into the position where it will register with the arrow line 106.

A tension spring 108 is attached at one of its ends to the extremity of the lever 104. The remaining end of the spring is suitably attached to a pin 109 which may form the head of a securing screw, or the like, which attaches the side plate 17 to the housing 15.

These several figures disclose a cotter pin 110 as being employed for retaining the lever 104 on the end portion of the adjusting screw 41. It will be understood, however, that any other suitable holding means may be employed.

In the several figures so far referred to, three different forms of instrumentalities have been disclosed for effecting rotation of the adjusting screw 41. These devices are all illustrated as being located outside of the enclosure for the gearing which is formed by the housing 15 and the side plates 17. It will be understood, however, that these adjusting devices may be located within the enclosure formed by the housing 15 and the side plates 17 if such an arrangement is deemed to be more desirable. Also, a special enclosing casing or housing may be applied over this mechanism and suitably attached to the adjacent side plates 17 if it is preferred that these adjusting devices be located outside of the main housing but should be enclosed so that they cannot be tampered with or damaged by trucks, or the like, which might accidentally bump into the unit.

The previously referred to figures, and particularly Figs. 1 to 3, inclusive, 6 and 9, disclose variable speed transmission units in which the speed variations between the driver and driven shafts are obtained by the V-belt or chain gearing which connects the same and the difference in speed of the two shafts is dependent entirely upon this gearing. In this type of unit, the side plates 17 add but little to the overall width of the housing 15, and it is a simple matter to extend the adjusting screw 41 through one of these side plates.

There are several other models of variable speed transmission units of this general type which have additional instrumentalities or devices permanently incorporated therein or attached thereto which so modify the units disclosed in the preceding figures that it becomes impractical or impossible to extend the adjusting screw through a side plate. For example, one very popular model of this type of variable speed transmission mechanism is motorized; i. e., an electric driving motor is permanently attached to the housing side plate at the center of one side of the housing. This motor is detachable from the housing with the side plate, or the motor may be separated from its side plate. However, the central location of the motor makes necessary the use of an additional set of gears between its armature shaft and the driver shaft of the variable speed gearing unit. This additional gearing, plus the presence of the motor exteriorly of the side plate, prevents extending the adjusting screw to a point exterior of the side plate.

In other models, a speed reducing or increasing gear set is provided at the output side of a motorized unit. With this type of unit, both sides of the housing are obstructed so that it is impossible to extend the adjusting screw in either direction so that its extremity will project through a side plate of the housing. A still further model variable speed transmission of this type employs reducing and/or increasing gear sets at both the input and output sides of the unit. The inclusion of these two gear sets, also, prevents extending the adjusting screw through either side plate of the housing.

To overcome the difficulty arising from the addition of motors and/or input and output gear sets to the opposite sides of the basic variable speed gearing mechanism, a modified form of automatic tensioning mechanism has been developed which will dispense with the need for extending the adjusting screw through a side plate of the housing so that actuating means for this screw may be located outside of a side plate, as is illustrated in the preceding figures. This modified form of mechanism is disclosed in detail in Figs. 12 to 16, inclusive.

To illustrate this modified form of tensioning mechanism, these figures disclose the same in connection with a variable speed transmission unit to which has been added a speed increasing gear set on the input side of the unit. It is to be understood, however, that this tensioning mechanism will operate in the same manner and be arranged in the same way with each of the aforementioned models of transmission units which are motorized or which are provided with speed increasing or decreasing gear sets on either or both of their input and output sides. Additionally, this automatic tensioning mechanism can be employed in place of the adjusting screw actuating mechanisms disclosed in the preceding figures on models which are not provided with additional gear sets or which are not motorized.

In other words, although this form of tensioning mechanism was developed primarily for the purpose of being used with variable speed transmission units which are motorized and which are provided with additional gear sets, its use is not limited to these models.

In Figs. 12 to 16, inclusive, I have avoided as much as possible the disclosure of details of the variable speed transmission units which are fully illustrated in Figs. 2 and 3. It is to be understood, however, that these various elements form a part of the unit now being specifically discussed. Referring first to Figs. 12 and 13, the same housing 15 with its base 16 is illustrated. The opening in the top of the housing is closed by the removable inspection cover plate 18. The oil gauge 21 is illustrated at the left-hand end of the housing. This housing end, also, is provided with a speed control gauge plate 55 with a speed setting indicator pointer 56 operatively associated therewith and mounted on the shaft 57. The speed control hand wheel 54 is illustrated in Fig. 12 as being positioned exteriorly of the housing on the speed control screw 53. The driver shaft 27 and driven shaft 28 are located in this figure.

In this unit, a modified form of side plate 111 is provided for supporting the bearings 26, not shown, for the driver and driven shafts 27 and 28. Centrally of these two shafts, the side plate 111 is provided with a bearing opening 112 in which is mounted a suitable bearing 113 for supporting the inner end 114 of the stub power input shaft 115. This input shaft extends through a bearing opening 116 formed centrally in the housing extension 117 which overlies the side plate 111. A suitable bearing 118 is arranged in the bearing opening 116 for supporting the input shaft 115 as it passes through the wall of the housing extension 117. An annular bearing cap 119 is employed for retaining the bearing 118 in place in the bearing opening 116.

Fig. 12 discloses a pinion 120 mounted on the driver shaft 27. This pinion meshes with a gear 121 keyed to the stub input shaft 115, see also Fig. 13. With this gear set arrangement, the driver 27 will be rotated at a higher rate of speed than the power input shaft 115.

Fig. 13 discloses an adjusting screw 41a which differs but slightly structurally from the adjusting screw of the previously described figures. This adjusting screw 41a has one end portion 122 journaled in a bearing provided in the bearing cup portion 123 which is formed as a part of the side plate 111 and additionally functions to receive the bearing 113 of the inner end of the input shaft 115. Inwardly of this journaled portion 122 of the adjusting screw 41a, the said screw has keyed thereto a bevel or crown gear 124.

This Fig. 13 discloses the fulcrum blocks 39 adjustably mounted on the threaded sections or portions 40a of the adjusting screw 41. By comparing this disclosure with Figs. 4 and 7, it will be noted that these fulcrum blocks have been reversed or turned face-for-face. These fulcrum blocks have been reversed so that they will better accommodate the bevel or crown gear 124 while providing the same extent or degree of adjustment. The fulcrum blocks are further illustrated in this Fig. 13 as having pivot studs 44 on which are mounted the operating levers 45.

The mechanism to be described from this point on will be understood as taking the place of the adjusting screw actuating mechanism disclosed in detail in Figs. 1, 2, 4, and 6 to 11, inclusive, of the previously described forms of the invention.

This mechanism includes a shaft 125 which extends through an opening 126 formed in an enlargement 127 of the side plate 111. This shaft has integrally formed on its inner end a bevel pinion 128 which constantly meshes with the bevel gear 124 keyed to the adjusting screw 41a. Inwardly of this pinion 128, the shaft 125 has formed thereon an enlargement 129 which is of proper size to act as a bearing support for the inner end of the shaft 125.

The shaft is of proper length to project outwardly of the opening 126 formed in the side plate 111 and extend upwardly of the entire transmission unit, as is best illustrated in Figs. 12 and 13. Surrounding the projecting portion of the shaft 125 is a housing member 130 which is generally of tubular formation. The upper portion of the housing has its bore 131 reduced in diameter, as at 132, to bear on the upper end portion of the shaft 125. The lower end of the housing 130 is enlarged at 133, see Figs. 14 and 15, and this enlargement is cut to provide a ratchet wheel. This housing 130 is rotatably attached to the side plate 111 by means of the hold-down piece 134 which is retained in place by the screws 135.

This hold-down piece is provided with a cavity 136 of proper shape, see Figs. 14 and 15, to accommodate the ratchet wheel 133 and the pawl 137. This pawl is provided with an operating finger 138 projecting through an opening 139 formed in the side wall of the cavity 136. A spring 140 is provided for normally retaining the pawl 137 in engagement with the teeth of the ratchet wheel 133. The pawl may be moved out of this engagement position by means of the finger piece 138.

The opening 126 of the cover plate enlargement 127 and the bore 131 of the housing 130 are made large enough to accommodate the spring 141 which is wrapped around the shaft 125. Figs. 13 and 14 clearly illustrate the inner end 142 of this spring as being attached to the shaft enlargement 129. Fig. 13 discloses the upper end portion 143 of the spring as being attached to the bearing portion 132 of the housing 130. This spring, therefore, interconnects the housing 130 and the shaft 125.

Figs. 12, 13, and 16 disclose the upper extremity of the housing 130 as being provided with an axial extension 144. Fig. 16 discloses this projection as having its inner side face 145 arranged on a chord of the circular top end of the housing 130. This projection 144 acts as a double stop for the indicating pointer 146 which is secured to the projecting end of the shaft 125 by serrations formed in the shaft and a snap ring 147. Fig. 12 discloses a portion of the housing 130 as being knurled, as at 148, to provide a grip for the housing.

The operation of this adjusting screw actuating mechanism will be described as follows:

It will be appreciated that the spring 141 is intended to rotate the adjusting screw 41a for applying tension to the flexible transmission member 38, not shown, in the same manner as the springs 74, 98, and 108 of Figs. 1, 6, and 9, respectively. Fig. 16 discloses the indicating pointer 146 in proper relation with respect to the stop 144 for the start of a cycle of operation. When the indicating pointer is in this position, the torsion spring 141 should be in a preloaded condition. This preloading is obtained by turning the housing 130 approximately two and a half, or more, turns in a clockwise direction, when viewed from above, before the indicating pointer 146 is attached to the upper end of the shaft 125.

As the force of the tension applying levers 60, see Fig. 3, decreases, the torsion spring 141 will overbalance the said levers and will effect rotation of the adjusting screw 41a through the medium of the shaft 125, its pinion 128, and the gear 124 keyed to the said screw. This actuation of the adjusting screw 41a is accompanied by rotation of the shaft 125 in a clockwise direction, when viewed from above, and the indicating pointer 146 will travel in a similar direction. A complete or full cycle of operation of this tensioning mechanism takes place when the indicating pointer has rotated in a clockwise direction approximately a half turn from its starting position of Fig. 16. After this extent of movement, the indicating pointer 146 will bear against the stop provided by the projection 144 of the housing 130. This location of the indicating pointer denotes time for resetting the housing. This resetting may be easily accomplished by an attendant who merely grasps the housing 130 in one hand and advances the housing in a clockwise direction until the indicating pointer 146 again occupies the position illustrated in Fig. 16. The knurled portion 148 of the housing makes possible this resetting of the housing without the use of a wrench. The pawl 137 permits this resetting of the housing. This pawl, however, will prevent any retrograde rotation of the housing as long as it engages the ratchet wheel 133.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In variable speed transmissions of the parallel shaft type, a contractible and expansible V-pulley mounted on each shaft and each including a pair of relatively movable members having opposed conical contact surfaces, relatively movable control levers for the pairs of relatively movable members pivoted on opposite sides of said pulleys, means for adjusting said control levers in opposite directions about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein and to increase the depth of the sag as slack develops in the transmission member, and means constantly exerting a force tending to move the pivots for the said control members toward each other for simultaneously increasing the effective diameters of both of said pulleys to reduce, but not eliminate, the amount of sag in the flexible transmission member, the combined effect of the respective forces of said two means being to apply the desired maximum tension to said flexible transmission member.

2. In a variable speed transmission of the parallel shaft type, a contractible and expansible V-pulley mounted on each shaft and each including a pair of relatively movable members having opposed conical contact surfaces, control members for the pairs of relatively movable members supported by separate pivots on opposite sides of said pulleys, means for adjusting said control members about their pivots to vary the effective diameters of said pulleys in opposite directions, a flexible transmission member trained over said pulleys for intimate contact with the same at their respective effective diameters, spring powered means engageable with the flexible transmission member for constantly applying force thereagainst to produce a sag therein and for increasing said sag as slack develops in the transmission member, and spring powered means constantly exerting a force tending to move the separate pivots for the said control members toward each other for simultaneously increasing the effective diameters of both of said pulleys to reduce, but not eliminate, the amount of sag in the flexible transmission member, the combined effect of the respective forces of said two means being to apply the desired maximum tension to said flexible transmission member.

3. In variable speed transmissions of the parallel shaft type, a contractible and expansible V-pulley mounted on each shaft, each of said pulleys including a pair of relatively movable members having opposed contact surfaces, control members for the pairs of relatively movable members pivoted on opposite sides of said pulleys, means for adjusting said control members about their pivots to vary the effective diameters of said pulleys in opposite directions, a flexible transmission member trained over said pulleys for intimate contact with the same at their respective effective diameters, means engageable with the flexible transmission member for constantly applying force thereagainst in such a manner as to produce a sag therein and to increase the depth of the sag as more slack develops in the transmission member but with the effectiveness of said force becoming less as the depth of the sag increases, and means constantly exerting a force tending to move the pivots for the said control members toward each other for simultaneously increasing the effective diameters of both of said pulleys to reduce, but not eliminate, the amount of sag in the flexible transmission member, the combined effect of the respective forces of said two means acting to apply the desired maximum tension to said flexible transmission member when the said forces are in equilibrium and the force of the second mentioned means acting to overpower the force of the first mentioned means to bring about an increase in the effective diameters of said V-pulleys when the depth of the sag reaches a certain predetermined value.

4. In variable speed transmissions of the parallel shaft type, a contractible and expansible V-pulley mounted on each shaft and each including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjustable screw rotatable to move the fulcrum blocks toward each other for simultaneously increasing the effective diameters of both of said pulleys, and means constantly exerting a force tending to turn the adjusting screw to increase the effective diameters of said pulleys so as to reduce, but not eliminate, the amount of sag in the flexible transmission member, the combined effect of the respective forces of said two means acting to apply the desired maximum tension to said flexible transmission member when the forces are in equilibrium and to re-establish this state of equilibrium, after it is lost as a result of wear of the flexible transmission member, by effecting rotation of the adjusting screw.

5. A variable speed transmission comprising parallel driver and driven shafts, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting the said control levers about their pivots to vary the effective diameters of said pulleys in opposite directions, a flexible transmission member trained over said pulleys for intimate contact with the same at their respective effective diameters, spring powered means engageable with the flexible transmission member for constantly applying force thereagainst to produce a sag therein, an adjusting screw rotatable to move the fulcrum blocks toward each other for simultaneously increasing the effective diameters of both of said pulleys, and spring powered means constantly exerting a force tending to turn the adjusting screw to increase the effective diameters of said pulleys so as to reduce, but not eliminate, the amount of sag in the flexible transmission member, the combined effect of the respective forces of said two means acting to apply the desired maximum tension to said flexible transmission member when the forces are in equilibrium and to re-establish this state of equilibrium, after it is lost as a result of wear of the flexible transmission member, by effecting rotation of the adjusting screw.

6. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the respective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, spring powered means constantly exerting a force tending to turn the adjusting screw to increase the effective diameters of said pulleys so as to reduce, but not eliminate, the amount of sag in the flexible transmission member, and means for periodically resetting the spring powered means as the effective force of its spring is diminished by producing movements of the adjusting screw.

7. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered lever, and means for operatively connecting the lever to the adjusting screw so that the lever will constantly exert a force tending to turn the screw to increase the effective diameters of said pulleys so as to reduce, but not eliminate, the amount of sag in the flexible transmission member.

8. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered lever, and means for operatively connecting the lever to the adjusting screw so that the lever will constantly exert a force tending to turn the screw to increase the effective diameters of said pulleys so as to reduce, but not eliminate, the amount of sag in the flexible transmission member, said connecting means being constructed to permit the spring powered lever to be periodically reset with respect to the adjusting screw as the effective force of its spring diminishes.

9. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered member, means for operatively connecting the member to the adjusting screw so that the member will constantly exert a force tending to turn the screw to increase the effective diameters of said pulleys so as to reduce, but not eliminate, the amount of sag in the flexible transmission member, said connecting means being constructed to permit the spring powered member to be periodically reset with respect to the adjusting screw as the effective force of its spring diminishes, and means for preventing retrograde movement of the adjusting screw either after adjustment by said spring loaded member or while the member is being reset.

10. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered lever loosely mounted on the adjusting screw, and resettable means for operatively connecting the lever to the adjusting screw so that the lever will constantly exert a force tending to turn the screw to increase the effective diameters of said pulleys so as to reduce, but not eliminate, the amount of sag in the flexible transmission member.

11. In variable speed transmissions of the parallel shaft type, a contractible and expansible V-pulley mounted on each shaft, and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered lever loosely mounted on the adjusting screw, a ratchet wheel fast on the adjusting screw, and a pawl carried by the lever and engageable with the ratchet wheel to cause the lever to constantly exert a force tending to turn the screw to increase the effective diameters of said pulleys so as to reduce, but not eliminate, the amount of sag in the flexible transmission member.

12. In variable speed transmissions of the parallel-shaft type, a contractible and expansible V-pulley mounted on each shaft, and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered lever loosely mounted on the adjusting screw, a ratchet wheel fast on the adjusting screw, a pawl carried by the lever and engageable with the ratchet wheel to cause the lever to constantly exert a force tending to turn the screw to increase the effective diameters of said pulleys so as to reduce, but not eliminate, the amount of sag in the flexible transmission member, and means engageable with the ratchet wheel for preventing retrograde movement of the adjusting screw either after adjustment by said spring loaded lever or while the lever is being reset.

13. In variable speed transmissions of the parallel shaft type, a contractible and expansible V-pulley mounted on each shaft, and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, said adjusting screw having a multi-sided end portion, and a spring powered lever having an opening formed therein to fit the said end portion of the screw so that the lever will constantly exert a force tending to turn the screw to increase the effective diameters of said pulleys so as to reduce, but not eliminate, the amount of sag in the flexible transmission member, the opening in the lever being so arranged relative to the length of the lever that the lever may be reset relative to the screw by removing, reversing, and replacing the lever relative to the screw.

14. In a variable speed transmission of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control levers, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a spring powered rotatable shaft, and means for operatively connecting the shaft to the adjusting screw so that the shaft will constantly exert a force tending to turn the screw to increase the effective diameters of said pulleys so as to reduce, but not eliminate, the amount of sag in the flexible transmission member.

15. In variable speed transmissions of the parallel shaft type, a contractible and expansible V-pulley mounted on each shaft and each pulley including a pair of relatively movable members having opposed conical contact surfaces, control levers for the pairs of relatively movable members arranged on opposite sides of the V-pulleys, a fulcrum block on each side of the V-pulleys for pivotally mounting said control lever, means for adjusting said control levers about their pivots to vary the effective diameters of said pulleys in opposite directions, a flexible transmission member trained over said pulleys for intimate contact with the same at their respective effective diameters, means engageable with the flexible transmission member for constantly applying force thereagainst to produce a sag therein, an adjusting screw rotatable to move the fulcrum blocks toward each other for simultaneously increasing the effective diameters of both of said pulleys, a rotatable shaft, spring means connected at one end to the said shaft for exerting a force tending to rotate the shaft, means for adjustably holding the remaining end of the spring means, said holding means being adjustable to re-tension the spring means after it has been partially expended in rotating the shaft, and means for operatively connecting the shaft to the adjusting screw so that the shaft will constantly exert a force tending to turn the screw to increase the effective diameter of said pulleys so as to reduce, but not eliminate, the amount of sag in the flexible transmission member.

16. In variable speed transmissions of the parallel shaft type, a contractible and expansible V-pulley mounted on each shaft, a flexible transmission member trained over said pulleys for intimate contact with the same at their respective effective diameters, means engageable with the flexible transmission member for applying force thereagainst in a manner to produce a sag therein and to increase the depth of the sag in response to the development of slack in the transmission member, means exerting a force tending to increase the effective diameters of said V-pulleys to reduce, but not eliminate, the amount of sag in the flexible transmission member, and means preventing retrograde action of the last mentioned force exerting means so that its force will be constantly applied in only one direction, the respective forces of said two first mentioned means coacting with each other to apply the desired maximum tension to said flexible transmission member when the forces are in equilibrium.

17. In variable speed transmissions of the parallel shaft type, a contractible and expansible V-pulley mounted on each shaft, a flexible transmission member trained over said pulleys for intimate contact with the same at their respective effective diameters, spring powered means engageable with the flexible transmission member for applying force thereagainst in a manner to produce a sag therein and to increase the depth of the sag in response to the development of slack in the transmission member, spring powered means exerting a force tending to increase the effective diameters of said V-pulleys to reduce, but not eliminate, the amount of sag in the flexible transmission member, and means preventing retrograde action of the last mentioned force exerting means so that its force will be constantly applied in only one direction, the respective forces of said two first mentioned means coacting with each other to apply the desired maximum tension to said flexible transmission member when the forces are in equilibrium.

18. In variable speed transmission of the parallel shaft type, a contractible and expansible V-pulley mounted on each shaft, a flexible transmission member trained over said pulleys for intimate contact with the same at their respective effective diameters, separate interconnected means engageable respectively with the driving and non-driving runs of the flexible transmission member for applying force thereagainst in such a manner as to produce a sag in the non-driving run thereof and to increase the depth of the sag in response to the development of slack in the transmission member with the effectiveness of said force becoming less as the depth of the sag increases, means exerting a force tending to increase the effective diameters of said V-pulleys to reduce, but not eliminate, the amount of sag in the flexible transmission member, and means preventing retrograde action of the last mentioned force exerting means so that its force will be constantly applied in only one direction, the respective forces of said first two mentioned means coacting with each other to apply the desired maximum tension to said flexible transmission member when the forces are in equilibrium and the force of the second mentioned means acting to overpower the force of the first mentioned means to bring about an increase in the effective diameters of said V-pulleys when the depth of the sag reaches a predetermined value.

19. In variable speed transmissions of the parallel shaft type, a contractible and expansible V-pulley mounted on each shaft, a flexible transmission member trained over said pulleys for intimate contact with the same at their respective effective diameters, separate means engageable respectively with the driving and non-driving runs of the flexible transmission member, spring means for interconnecting said separate means to cause them to collectively apply force against the transmission member to produce a sag in its non-driving run and to increase the depth of the sag in response to the development of slack in the transmission member with the effectiveness of said force becoming less as the depth of the sag increases, and spring powered means constantly exerting a force tending to increase the effective diameters of said V-pulleys to reduce, but not eliminate, the amount of sag in the flexible transmission member, the respective forces of said two means coacting with each other to apply the desired maximum tension to said flexible transmission member when the forces are in equilibrium and the force of the second mentioned means acting to overpower the force of the first mentioned means to bring about an increase in the effective diameters of said V-pulleys when the depth of the sag reaches a predetermined value.

HENRY G. KELLER.